(12) United States Patent
Xu et al.

(10) Patent No.: US 12,523,584 B2
(45) Date of Patent: Jan. 13, 2026

(54) COLLABORATIVE TESTING SYSTEM FOR ELASTIC WAVE AND TENSILE DAMAGE OF ROCK

(71) Applicant: Sichuan University, Sichuan (CN)

(72) Inventors: Huining Xu, Sichuan (CN); Tianqi Liu, Sichuan (CN); Jianfeng Liu, Sichuan (CN); Fujun Xue, Sichuan (CN); Lu Wang, Sichuan (CN); Yougang Cai, Sichuan (CN); Jinbing Wei, Sichuan (CN); Jingjing Dai, Sichuan (CN); Lina Ran, Sichuan (CN); Jianliang Pei, Sichuan (CN); Hua Li, Sichuan (CN); Jianhui Deng, Sichuan (CN)

(73) Assignee: Sichuan University, Sichuan (CN)

( * ) Notice: Subject to any disclaimer, the term of this patent is extended or adjusted under 35 U.S.C. 154(b) by 268 days.

(21) Appl. No.: 18/454,945

(22) Filed: Aug. 24, 2023

(65) Prior Publication Data

US 2024/0068917 A1  Feb. 29, 2024

(30) Foreign Application Priority Data

Aug. 30, 2022  (CN) .......................... 202211047674.8

(51) Int. Cl.
*G01N 3/08* (2006.01)
*G01N 3/06* (2006.01)
*G01N 33/24* (2006.01)

(52) U.S. Cl.
CPC ................. *G01N 3/06* (2013.01); *G01N 3/08* (2013.01); *G01N 33/24* (2013.01); *G01N 2203/0658* (2013.01)

(58) Field of Classification Search
CPC ........... G01N 3/06; G01N 3/08; G01N 33/24; G01N 2203/0658
See application file for complete search history.

(56) References Cited

FOREIGN PATENT DOCUMENTS

| CN | 101813588 B | * | 11/2011 | |
|---|---|---|---|---|
| CN | 103954690 B | * | 12/2014 | |
| CN | 206248434 U | * | 6/2017 | |
| CN | 105842343 B | * | 8/2018 | ............. G01N 29/14 |
| CN | 109283047 A | * | 1/2019 | ............... G01N 3/08 |
| CN | 114486547 A | * | 5/2022 | ............. G01N 29/14 |

* cited by examiner

*Primary Examiner* — Jamel E Williams
(74) *Attorney, Agent, or Firm* — NKL Law; Allen Xue (57) ABSTRACT

An integrated acoustic detection and rock direct tensile test machine includes a support frame. A top of the support frame is provided with a top plate and a bearing plate is provided above the top plate. The bearing plate is provided with force transferring rods, lower ends of which are provided with a tensile base. A top of the tensile base is provided with a lower clamp holder and a bottom of the top plate is provided with an upper clamp holder. An upper channel is provided inside the upper clamp holder. The upper channel is provided with an acoustic transmitting probe. A lower channel is provided inside the lower clamp holder. One end of the lower channel is communicated with the outside, the other end is provided with an acoustic receiving probe. The lower channel extends to a bottom of a clamping chamber of the lower clamp holder.

7 Claims, 5 Drawing Sheets

COLLABORATIVE TESTING SYSTEM FOR ELASTIC WAVE AND TENSILE DAMAGE OF ROCK

FIELD OF THE INVENTION

The present invention belongs to the technical field of rock direct tensile test, and in particular relates to an integrated acoustic detection and rock direct tensile test machine and a test method thereof.

DESCRIPTION OF THE RELATED ART

A test of three kinds of mechanical parameters of rock, such as crush resistance, tensile strength and shear strength, is indispensable in all rock engineering constructions. A tensile test of rock samples is an important means to understand tensile load bearing capacity of the rock. As one of basic mechanical parameters in engineering constructions, a tensile strength value of the rock is very important for engineering design calculation. At present, there are two main methods used to determine the tensile strength value of the rock: an indirect tensile method and a direct tensile method.

The indirect tensile method is also known as a Brazilian splitting method. Because of its simple operation and wide universality, it can be implemented on all conventional material compression mechanical test machines, and it is also the only recommended test method in a national standard "Engineering Rock Mass Test Method Standard". Although the Brazilian splitting method is a widely recommended test method in ISRM and "Engineering Rock Mass Test Method Standard", specific test methods are different and can be divided into direct loading methods, pad strip methods and arc loading methods.

The recommended method in the "Engineering Rock Mass Test Method Standard" is to add a metal pad strip between a specimen and an indenter, and is to add a cork pad between the specimen and the indenter for a soft rock. Although it is to ensure that the indenter transfers a linear concentrated load to an end of the specimen, it still does not solve the problem of brittle rock ends being brittle, and a research shows that the tensile strength of the rock obtained by this method is small.

In the ISRM, it is recommended to set a contact point between the indenter and the specimen as an arc. Although this method ensures that the end of the specimen is an arc compression zone and reduces a risk of breakage of the end of the specimen to a certain extent, this method requires an arc of the indenter to match a size of the sample, which not only has low universality, but also leads to a high tensile strength. Although this method is simple to operate and can be carried out on all material compression mechanical test machines, it still has the following shortcomings on the whole: (1) Due to influence of an end loading zone, the accuracy of the measured tensile strength is still an unavoidable problem; (2) During a splitting process, it is difficult to ensure that the splitting surface must follow a predetermined loading surface; (3) There is no guarantee that a fracture surface must be a failure surface with the smallest bearing capacity, especially for rocks with obvious bedding and defects. Therefore, the tensile strength value measured by the indirect measurement can not fully reflect a real situation.

In order to solve the problem that results of the indirect tensile test can not fully reflect the real situation, the direct tensile method is used to test tensile mechanical properties of the rocks. However, the direct tensile method has higher requirements on a tensile function of a test apparatus, resulting in a failure to use an ordinary compression mechanical test machine for test and low applicability. In order to test the tensile mechanical properties of rocks under different conditions, the applicant combines a direct tensile function of the most advanced MTS815 rock mechanical test system in the world to solve part problems existing in the test, and has obtained a number of patents such as ZL200610022224.8, U.S. Pat. No. 7,624,647B2, ZL201510068200.5, ZL201510068186.9, U.S. Pat. No. 9,488,560B2 and U.S. Pat. No. 9,488,559B2. However, for the direct tensile test of rock mechanical properties, there are still the following shortcomings: (1) Performance requirements for a mechanical test apparatus are high, and the test is carried out in a conventional material test machine, so the universality of promotion is low; (2) An MTS815 test machine is utilized for the direct tensile test, and in the test process, disassembly and assembly of loading parts are very tedious and need cooperation of more than one person to complete, so the whole process is time-consuming and laborious; (3) The loading parts to be disassembled and assembled are all steel modules, which are large in volume and heavy in weight, and the disassembly process may cause serious safety hazards such as an apparatus damage or personnel injury; (4) The installation and test process of the direct tensile is complicated, which requires at least 2 persons to cooperate and still requires a lot of labor; (5) In the test, due to the need to use a plurality of loading pad blocks for piling and 2 long loading chains are respectively connected with 2 tensile ends of the rock, an eccentric tensile force is easy to appear which affects the test results; and (6) In the field of test the direct tensile mechanical properties of rocks, it is currently not possible to carry out acoustic detection in the direct tensile test of rocks.

BRIEF DESCRIPTION OF THE INVENTION

The present invention aims to provide an integrated acoustic detection and rock direct tensile test machine that can be carried out on all material pressure test machines and a test method thereof, which can ensure a failure occurs along a part with the lowest bearing force of the sample, ensure the measurement accuracy and reduce the test cost at the same time, and can carry out acoustic detection while carrying out the direct tensile test.

The purpose of the present invention is realized as follows: an integrated acoustic detection and rock direct tensile test machine, comprising a support frame, wherein a top of the support frame is fixed with a top plate, a bearing plate is provided above the top plate, the bearing plate is provided with a plurality of vertical force transferring rods, the force transferring rods vertically penetrate through the top plate and have a sliding fit with the top plate, lower ends of the force transferring rods are provided with a tensile base, a top of the tensile base is provided with a lower clamp holder, a bottom of the top plate is provided with an upper clamp holder, and a clamp center of the upper clamp holder coincides with a clamp center of the lower clamp holder; an upper channel is provided inside the upper clamp holder, one end of the upper channel is communicated with the outside, the other end is provided with an acoustic transmitting probe, and a transmitting direction of the acoustic transmitting probe is downward; and a lower channel is provided inside the lower clamp holder, one end of the lower channel is communicated with the outside, the other end is provided with an acoustic receiving probe, and the acoustic receiving probe receives an acoustic wave transmitted by the corresponding transmitting probe; and the transmitting end may also be used as a receiving end, and the receiving end may also be used as the transmitting end.

Further, an upper horn-shaped sealing sleeve is provided between the acoustic transmitting probe and an inner wall of the upper channel, and a lower horn-shaped sealing sleeve is provided between the acoustic receiving probe and an inner wall of the lower channel.

Further, a first probe spring is provided below the acoustic receiving probe, and a second probe spring is provided above the acoustic transmitting probe.

Further, the support frame comprises a base and a plurality of vertical columns arranged on the base, and the top plate is fixed on upper parts of the vertical columns through first fixing nuts.

Further, the tensile base is fixed on the lower ends of the force transferring rods through second fixing nuts.

Further, the tensile base is provided with a lower ball head sliding fitted with the tensile base, and the lower clamp holder is fixed on the lower ball head; and the top plate is provided with an upper ball head sliding fitted with the top plate, and the upper clamp holder is fixed on the upper ball head.

Further, the lower clamp holder is installed on a lower ball head through a lower latch, and the upper clamp holder is installed on an upper ball head through an upper latch.

A test method of the integrated acoustic detection and rock direct tensile test machine, wherein one end of a sample is bonded to the lower clamp holder by strong glue, the other end of the sample is bonded to the upper clamp holder by the strong glue, an oil pressure protection heat shrink film is fixed on outer walls of the lower clamp holder, the sample and the upper clamp holder, then the whole rock tensile test machine is placed in a pressure chamber; the acoustic transmitting probe is connected to an acoustic transmitting wire, the acoustic receiving probe is connected to an acoustic receiving wire, the acoustic transmitting wire and the acoustic receiving wire are connected to an external acoustic control system, and an acoustic detection is carried out on the sample; the pressure chamber is filled with oil to apply triaxial lateral compression stresses, a compression load is applied to the bearing plate through an indenter of the test machine, the compression load is transmitted through the force transferring rods to the tensile base, and the tensile base forms a tensile load on the sample, wherein a magnitude of the tensile load is equal to that of a compression load applied by a material compression mechanical test machine; and when the sample is destroyed, the oil in the pressure chamber is pumped back, and the acoustic transmitting wire and the acoustic receiving wire are removed.

Further, the lower clamp holder and the upper clamp holder are removed before a test; during the test, one end of the sample is bonded to the lower clamp holder by the strong glue, and the other end of the sample is bonded to the upper clamp holder by the strong glue; then the upper clamp holder is connected to an upper ball head by using an upper latch, and the lower clamp holder is connected to a lower ball head by using a lower latch.

The present invention has the following advantages: 1. The present invention can carry out the rock tensile test only by using a conventional material test machine, without adding a separate tensile test apparatus, and has wide universality, which overcomes the defect of high apparatus cost of the traditional direct tensile method.

2. The present invention adopts the direct tensile method of compression-rotary-tension, which can ensure the failure occurs along the part with the lowest bearing force of the sample, and overcome the defect of low accuracy of the traditional indirect tensile method.

3. The structure of the device is simple, which is mainly consisted of a steel structure; compared with a similar tensile test apparatus, the cost is low; it has a small size and a light weight, so it is easy to be moved; the operation is convenient and labor-saving, and one person can carry out the test, which reduces the use cost; it avoids accidents such as an accidental damage to the apparatus and personal safety of an operator due to disassembly of heavy loading parts, which has high safety; and the tensile structure is compact, which avoids an eccentric bearing force problem that may exist in the superposition of a plurality of parts.

4. Because the present invention has a compact structure and a small volume, it can be placed in the pressure chamber of the existing triaxial test machine, solving the problem that the rock direct tensile test cannot be carried out under the triaxial lateral stresses; and the problem that the rock direct tensile test cannot be carried out under the acoustic detection is solved by providing acoustic components at the positions of the clamp holders.

Reference numbers: 1—base; 2—vertical column; 3—top plate; 4—first fixing nut; 5—bearing plate; 6—force transferring rod; 7—tensile base; 8—second fixing nut; 9—lower ball head; 10—lower latch; 11—lower clamp holder; 12—sample; 13—upper clamp holder; 14—upper latch; 15—upper ball head; 16—oil pressure protection heat shrink film; 17—upper channel; 18—acoustic transmitting probe; 19—upper horn-shaped sealing sleeve; 20—second probe spring; 21—acoustic receiving probe; 22—lower horn-shaped sealing sleeve; 23—first probe spring; 24—lower channel; 25—rock tensile test device; 26—pressure chamber; 27—acoustic transmitting wire; 28—acoustic receiving wire.

DETAILED DESCRIPTION OF EMBODIMENTS OF THE INVENTION

The present invention is further described with reference to the accompanying drawings and embodiments.

Figure 1:
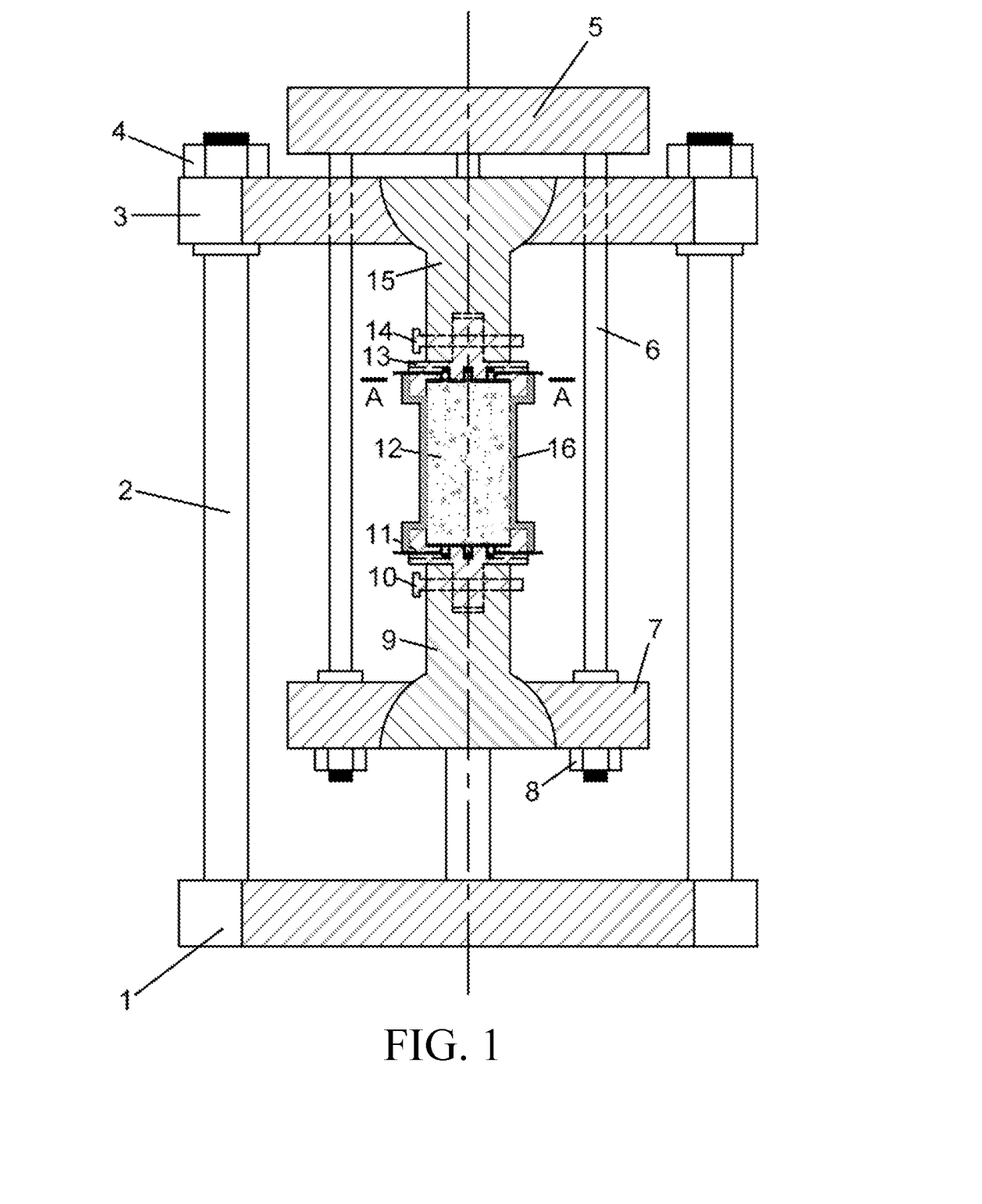
FIG. 1 is a schematic diagram of the present invention.

As shown in FIG. 1, an integrated acoustic detection and rock direct tensile test machine of the present invention comprises a support frame, wherein a top of the support frame is fixed with a top plate 3, a bearing plate 5 is provided above the top plate 3, the bearing plate 5 is provided with a plurality of vertical force transferring rods 6, the force transferring rods 6 vertically penetrate through the top plate 3 and have a sliding fit with the top plate 3, lower ends of the force transferring rods 6 are provided with a tensile base 7, a top of the tensile base 7 is provided with a lower clamp holder 11, a bottom of the top plate 3 is provided with an upper clamp holder 13, and a clamp center of the upper clamp holder 13 coincides with a clamp center of the lower clamp holder 11.

The support frame is used to support other parts, and can adopt various structural frames. Preferably, the support frame comprises a base 1 and a plurality of vertical columns 2 arranged on the base 1, and the top plate 3 is fixed on upper parts of the vertical columns 2 through first fixing nuts 4. The base 1 adopts a metal plate of a certain thickness, and the vertical columns 2 may adopt cylindrical metal rods, which may be hollow tubes. Lower ends of the vertical columns 2 can be welded with the base 1, or a common connection method such as threaded fit can be used. The upper parts of the vertical columns 2 are provided with external threads, which can be positioned by setting the first fixing nuts 4 on upper and lower surfaces of the top plate 3. Alternatively, support steps can be arranged on outer walls of the upper parts of the vertical columns 2, the top plate 3 is placed on the support steps, and the first fixing nuts 4 are arranged on the upper surface of the top plate 3 to lock the top plate 3. The top plate 3 can be disassembled and installed, and the top plate 3 can be removed when being moved, which also facilitates adjustment of a height of the top plate 3.

Figure 2:
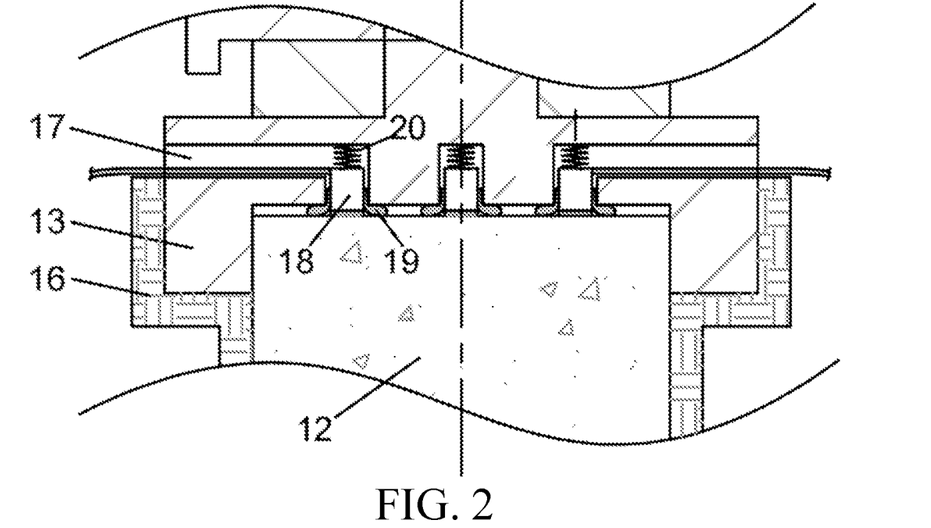
FIG. 2 is an enlarged schematic diagram of an upper clamp holder of the present invention.

The base 1 and top plate 3 can be a square, circular, triangle or other shapes, preferably the triangle with rounded angles as shown in FIG. 2. The number of the vertical columns 2 can be 3, 4, etc., preferably 3, which can position the top plate 3 more stably and fix it better. A smaller number of the vertical columns 2 are used, and space between the vertical columns 2 is larger, which reserves operational space so that it is convenient to install other measurement sensors on the rock sample to be tested.

The bearing plate 5 is directly subjected to a compression load. The bearing plate 5, the force transferring rods 6 and the tensile base 7 constitute a tensile frame which converts the compression load into a tensile load. Upper ends of the force transferring rods 6 can be welded with the bearing plate 5, or can be connected by threaded connections, screw connections or positioning latch connections. The bearing plate 5 and the tensile base 7 can be a triangular, rectangular or other shapes, preferably a circular, and there are 3 force transferring rods 6, which can realize stable load transfer and prevent a tilt of the tensile frame. The lower ends of the force transferring rods 6 are provided with external threads, and the tensile base 7 is fixed to the lower ends of the force transferring rods 6 through second fixing nuts 8 for easy disassembly.

The bearing plate 5 is located above the top plate 3, and a spacing between the bearing plate 5 and the top plate 3 is appropriate to ensure that the compression load of the bearing plate 5 can be transferred to the force transferring rods 6. The force transferring rods 6 and the top plate 3 are sliding fitted, and fit gaps are as small as possible to ensure that the compression load is transferred vertically downward along the force transferring rods 6.

The upper clamp holder 13 and the lower clamp holder 11 are used for clamping a rock sample 12. The upper clamp holder 13 and the lower clamp holder 11 are both provided with a clamping blind slot. The clamping blind slot may be a circular slot or a square slot depended on a shape of the sample 12. The upper clamp holder 13 and the lower clamp holder 11 may be installed directly on the top plate 3 and the tensile base 7, respectively. As a preferred implementation, the tensile base 7 is provided with a lower ball head 9 sliding fitted with the tensile base 7, and the lower clamp holder 11 is fixed on the lower ball head 9; and the top plate 3 is provided with an upper ball head 15 sliding fitted with the top plate 3, and the upper clamp holder 13 is fixed on the upper ball head 15.

The lower ball head 9 and the upper ball head 15 are both provided with a hemispherical curved surface, while the top plate 3 is provided with a groove matched with a curved surface of the upper ball head 15, the tensile base 7 is provided with a groove matched with a curved surface of the lower ball head 9, so that the lower ball head 9 and the upper ball head 15 can be flexibly rotated within a certain angle range. After the processing of the sample 12, it is impossible to completely ensure that two end faces are perpendicular to an axis of the sample 12. After the lower clamp holder 11 and the upper clamp holder 13 are bonded to upper and lower end faces of the sample 12 respectively, it would cause that an axis of the tensile load cannot completely coincide with the axis of the sample 12. If there is a certain included angle, it would lead to an eccentric load and affect results. After setting the lower ball head 9 and the upper ball head 15, if the axis of the tensile load deviates from the axis of the sample 12 during the test, the lower ball head 9 and the upper ball head can automatically rotate under the action of the load, so that a load direction is consistent with the axial direction of the sample 12, so as to ensure the accuracy of the test results.

The lower clamp holder 11 can be welded to the lower ball head 9. Preferably, the lower clamp holder 11 is installed on the lower ball head 9 through a lower latch 10, and the upper clamp holder 13 is installed on the upper ball head 15 through an upper latch 14. A latch connection can be easily and quickly disassembled. In the test, the upper latch 14 and the lower latch 10 can be pulled out first, the lower clamp holder 11 and the upper clamp holder 13 are removed. After the two ends of the sample 12 are fixed to the lower clamp holder 11 and the upper clamp holder 13 respectively, the lower clamp holder 11 and the upper clamp holder 13 are then connected to the lower ball head 9 and the upper ball head 15 respectively through the latches. In this way, the installation of sample 12 is more convenient, which can ensure that the installation of the sample 12 is stable and firm, and the installation position is in a high precision to ensure accuracy of measurement. In addition, the lower clamp holder 11 and the upper clamp holder 13 for fixing the samples 12 of different shapes and sizes can be replaced, so that the device can be used for tensile tests on the samples 12 of various shapes and sizes.

Figure 3:
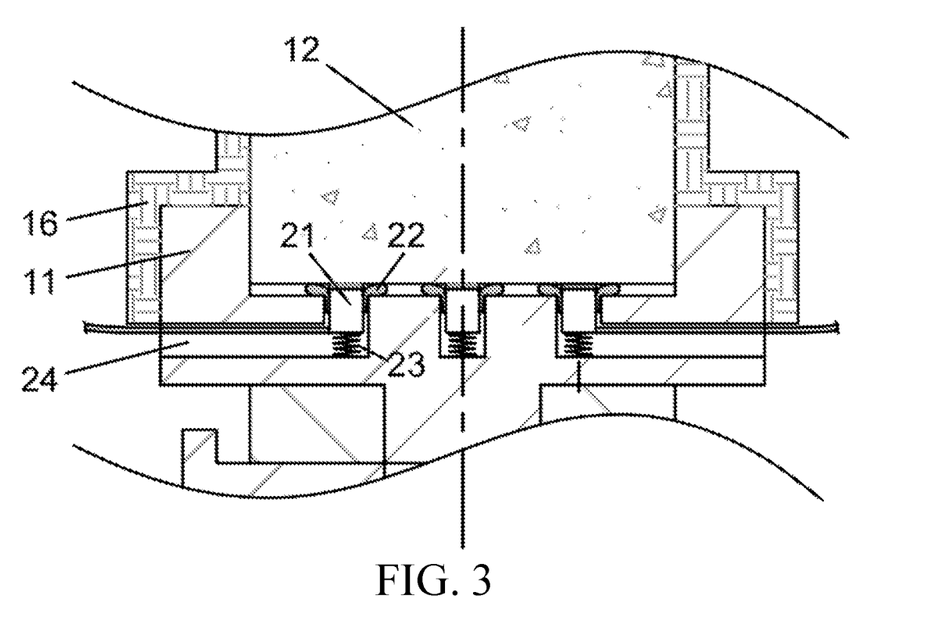
FIG. 3 is an enlarged schematic diagram of a lower clamp holder of the present invention.
Figure 6:
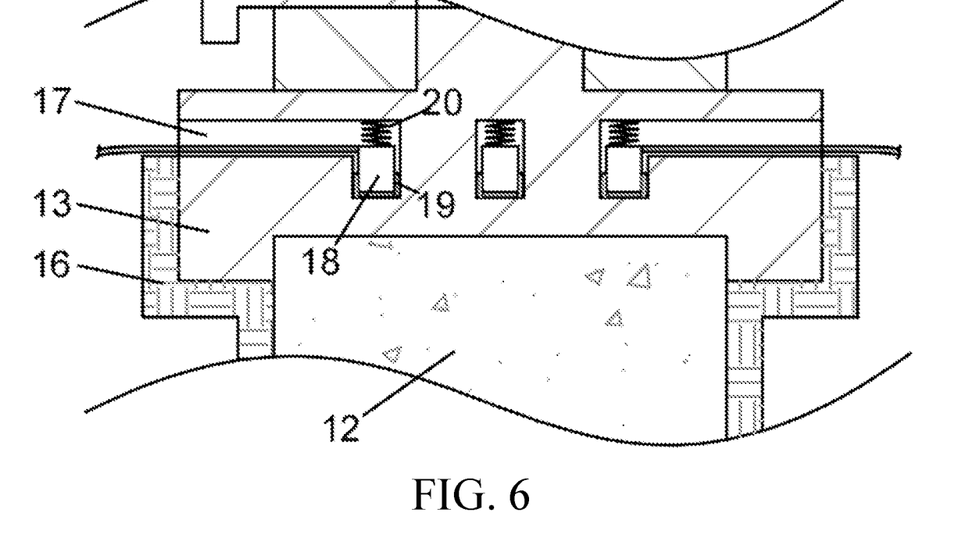
FIG. 6 is a schematic diagram of another installation method of acoustic transmitting probes.
Figure 7:
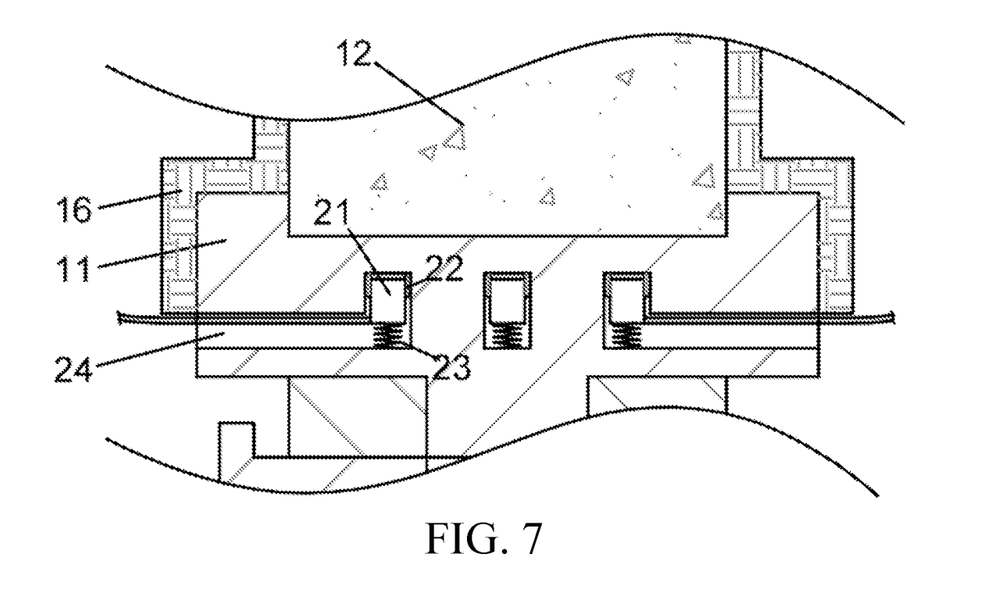
FIG. 7 is a schematic diagram of another installation method of acoustic receiving probes.

In order to realize an acoustic detection, the present invention provides acoustic components at the lower clamp holder 11 and the upper clamp holder 13. The acoustic components are as shown in FIG. 2 and FIG. 3, upper channels 17 are provided inside the upper clamp holder 13, one end of each upper channel 17 is communicated with the outside, the other end is provided with an acoustic transmitting probe 18, each upper channel 17 may extend to a bottom of a clamping chamber of the upper clamp holder 13, and a transmitting direction of each acoustic transmitting probe 18 is downward; and lower channels 24 are provided inside the lower clamp holder 11, one end of each lower channel 24 is communicated with the outside, the other end is provided with an acoustic receiving probe 21, each lower channel 24 may extend to a bottom of a clamping chamber of the lower clamp holder 11, and the acoustic receiving probes 21 receives an acoustic wave transmitted by the corresponding transmitting probes. The acoustic receiving probes 21 and the acoustic transmitting probes 18 may also not be directly in contact with the sample 12, as shown in FIG. 6 and FIG. 7.

The acoustic transmitting probes 18 are used to transmit an acoustic wave, and the acoustic receiving probes 21 are used to receive the acoustic wave. Each of the upper channel 17 and the lower channel 24 comprises a horizontal segment and a vertical segment in an L-shape. The horizontal segment is communicated with the outside, and the vertical segment is communicated with the clamping chamber of the clamp holder. The acoustic transmitting probes 18 and the acoustic receiving probes 21 are provided in the vertical segments so that the acoustic transmitting probes 18 can generate an acoustic wave downward. The acoustic receiving probes 21 can receive the acoustic wave transmitted by the acoustic transmitting probes 18 to realize the acoustic detection.

Figure 4:
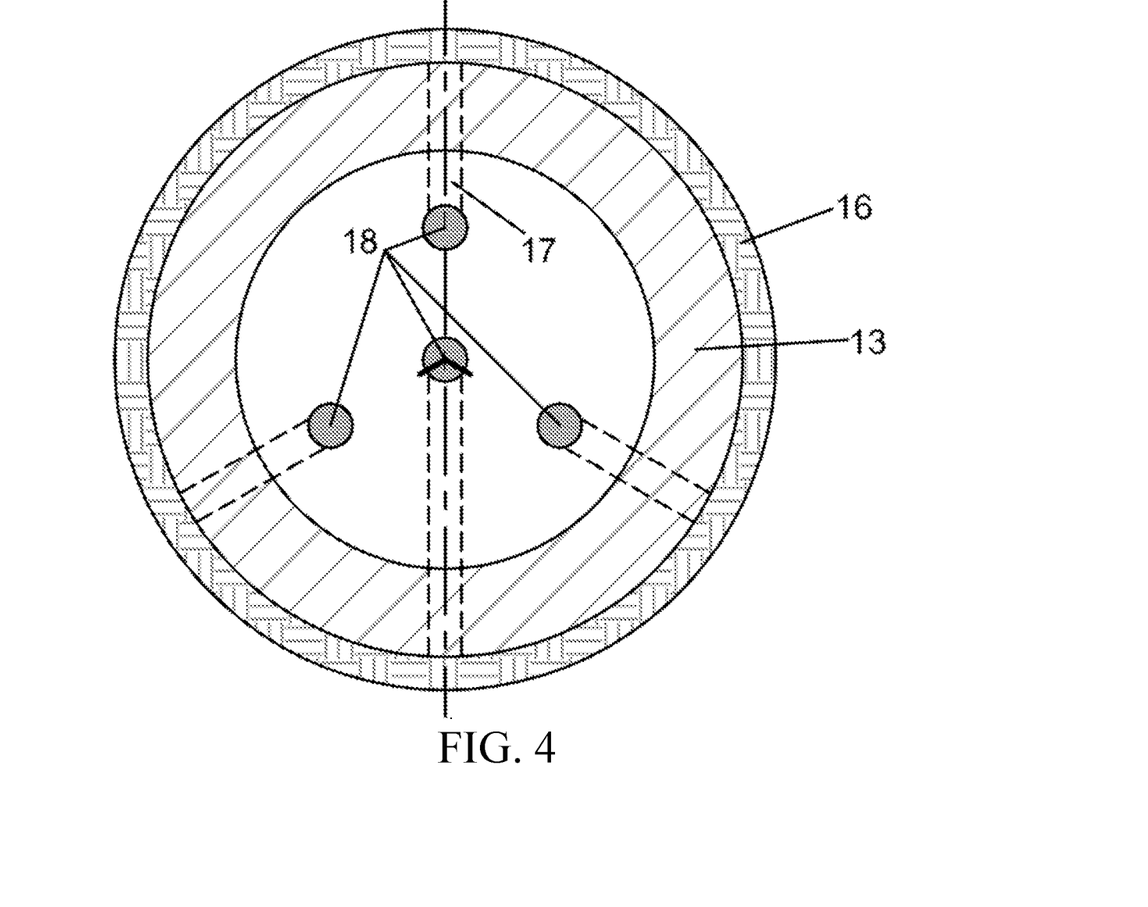
FIG. 4 is sectional schematic diagram of A-A in FIG. 1.

As shown in FIG. 4, the number of acoustic transmitting probes 18 is three and the three acoustic transmitting probes 18 are uniformly arranged around a center of the clamping chamber. The acoustic receiving probes 21 are also set up with 4 identities, with each acoustic receiving probe 21 corresponding to one acoustic transmitting probe 18.

Since the upper and lower end faces of the sample 12 should be bonded by strong glue, in order to prevent the strong glue from entering the upper channels 17 and the lower channels 24, an upper horn-shaped sealing sleeve 19 is arranged between each acoustic transmitting probe 18 and an inner wall of the upper channel 17, and a lower horn-shaped sealing sleeve 22 is arranged between each acoustic receiving probe 21 and an inner wall of the lower channel 24.

In order to improve a contact coupling effect and installation stability of the acoustic receiving probes 21 and acoustic transmitting probes 18, a first probe spring 23 is provided below each acoustic receiving probe 21, and a second probe spring 20 is provided above each acoustic transmitting probe 18. Upper ends of each first probe spring 23 and each second probe springs 20 are in tight contact with a top face of the corresponding horizontal segment, and lower ends are in contact with the corresponding acoustic receiving probe 21 and the acoustic transmitting probe 18, thereby pressing the acoustic receiving probe 21 and the acoustic transmitting probe 18.

In the integrated acoustic detection and rock direct tensile test machine of the present invention, the compression load is converted into the tensile load through the tensile frame consisted of the bearing plate 5, force transferring rods 6 and the tensile base 7, and the load applied to the sample 12 is equivalent to a load in an existing direct tensile test, which can ensure a failure occurs along a part with the lowest bearing force of the sample and overcome low accuracy of a traditional indirect tensile method.

Figure 5:
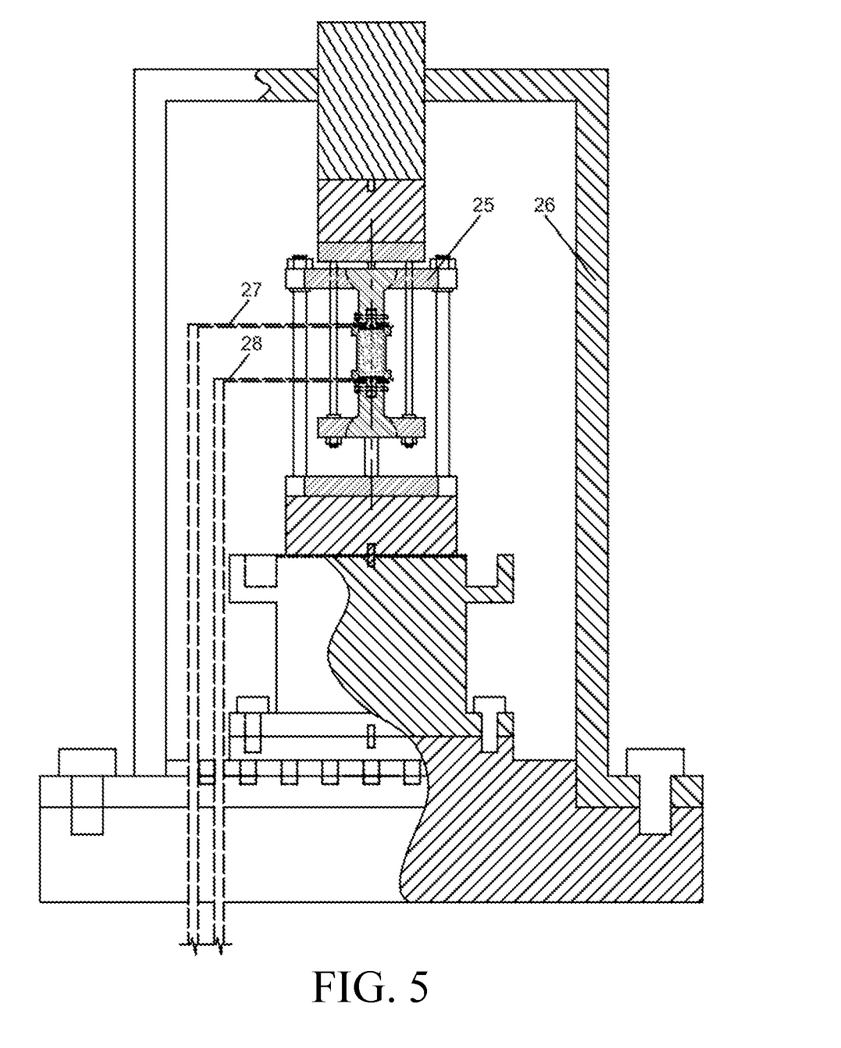
FIG. 5 is a schematic diagram when a test is carried out in the present invention.

In addition, the present invention has a simple structure, a low cost, a compact structure and a small volume, and can be put into a conventional triaxial test machine for a seepage test. The triaxial test machine comprises a pressure chamber 26, and a top of the pressure chamber 26 is provided with an indenter.

A test method of the integrated acoustic detection and rock direct tensile test machine is as follows: as shown in FIG. 5, one end of the sample 12 is bonded to the lower clamp holder 11 by the strong glue, and the other end of the sample 12 is bonded to the upper clamp holder 13 by the strong glue. When fixing the sample 12, the lower clamp holder 11 and the upper clamp holder 13 may not be removed from the test device, but this would cause the operation to be not convenient, and adhesive strengths between the two ends of sample 12 and the clamp holder are difficult to be uniform. Therefore, the lower clamp holder 11 and the upper clamp holder 13 are preferably removed before the test in the present invention. During the test, one end of the sample 12 is bonded to the lower clamp holder 11 by the strong glue, and the other end of the sample 12 is bonded to the upper clamp holder 13 by the strong glue. Then the upper clamp holder 13 is connected to the upper ball head 15 by using the upper latch 14, and the lower clamp holder 11 is connected to the lower ball head 9 by using the lower latch 10.

Then an oil pressure protection heat shrink film 16 is fixed on outer walls of the lower clamp holder 11, the sample 12 and the upper clamp holder 13 through a heat gun, and then the whole rock tensile test device 25 is placed in the pressure chamber 26. The acoustic transmitting probes 18 are connected to the acoustic transmitting wire 27, the acoustic receiving probes 21 are connected to the acoustic receiving wire 28, the acoustic transmitting wire 27 and the acoustic receiving wire 28 are connected to an external acoustic control system, and the acoustic detection is carried out on the sample 12.

The pressure chamber 26 is filled with oil to apply the triaxial lateral compression stresses, and the compression load is applied to the bearing plate 5 through the indenter of the test machine. The compression load is transferred to the tensile base 7 through the force transferring rods 6, and the tensile base 7 forms the tensile load on the sample 12, and the magnitude of the tensile load is equal to that of a compression load applied by a material compression mechanical test machine. Real-time acoustic detection is possible during the tensile process. When the sample 12 is destroyed, the oil in the pressure chamber 18 is pumped back, the acoustic transmitting wire 27 and acoustic receiving wire 28 are removed, and the sample 12 is taken out.

The foregoing is merely illustrative of the preferred embodiments of the present invention and is not intended to be limiting of the present invention, and for those skilled in the art, the present invention may have various changes and modifications. Any modifications, equivalent substitutions, improvements, and the like within the spirit and principles of the invention are intended to be included within the scope of the present invention.

The invention claimed is:

1. An integrated acoustic detection and rock direct tensile test machine, comprising:
   a support frame;
   a top plate affixed to a top of the support frame;
   a bearing plate provided above the top plate;
   a plurality of force transfer rods having an upper end affixed to the bearing plate, wherein the plurality of force transfer rods extend through the top plate and are in a sliding fit with the top plate, a lower end of the plurality of force transferring rods are affixed to a tensile base;
   a lower clamp holder disposed above a top of the tensile base;
   an upper clamp holder disposed below a bottom of the top plate, wherein a clamp center of the upper clamp holder coincides with a clamp center of the lower clamp holder;
   an upper channel is provided inside the upper clamp holder, a first end of the upper channel is communicated with the outside, a second end of the upper channel is provided with an acoustic transmitting probe, wherein a transmitting direction of the acoustic transmitting probe is downward;

a lower channel is provided inside the lower clamp holder, a first end of the lower channel is communicated with the outside, a second end of the lower channel is provided with an acoustic receiving probe, wherein the acoustic receiving probe is configured to receive a vertically downward acoustic wave;

an upper horn-shaped sealing sleeve disposed between the acoustic transmitting probe and an inner wall of the upper channel; and a lower horn-shaped sealing sleeve disposed between the acoustic receiving probe and an inner wall of the lower channel.

2. The integrated acoustic detection and rock direct tensile test machine according to claim 1, wherein a first probe spring is provided below the acoustic receiving probe, and a second probe spring is provided above the acoustic transmitting probe.

3. The integrated acoustic detection and rock direct tensile test machine according to claim 1, wherein the support frame comprises a base and a plurality of vertical columns arranged on the base, and the top plate (3) is fastened to the plurality of vertical columns using a plurality of first fixing nuts.

4. The integrated acoustic detection and rock direct tensile test machine according to claim 1, wherein the tensile base is fastened to the plurality of force transferring rods using a plurality of second fixing nuts.

5. The integrated acoustic detection and rock direct tensile test machine according to claim 1, wherein the tensile base is provided with a lower ball head sliding fitted with the tensile base, and the lower clamp holder is affixed to the lower ball head; and the top plate is provided with an upper ball head sliding fitted with the top plate, and the upper clamp holder is affixed to on the upper ball head.

6. The integrated acoustic detection and rock direct tensile test machine according to claim 1, wherein the lower clamp holder is installed on a lower ball head using a lower latch, and the upper clamp holder is installed on an upper ball head using an upper latch.

7. A test method for a sample using the integrated acoustic detection and rock direct tensile test machine according to claim 1, comprising:

affixing a first end of the sample to the lower clamp holder and a second end of the sample to the upper clamp holder, providing an oil pressure protection heat shrink film on an outer wall of the lower clamp holder;

placing the integrated acoustic detection and rock direct tensile test machine loaded with the sample in a pressure chamber (26);

connecting the acoustic transmitting probe to an acoustic transmitting wire, and connecting the acoustic receiving probe to an acoustic receiving wire;

connecting the acoustic transmitting wire and the acoustic receiving wire to an external acoustic control system, and carrying out an acoustic detection is carried out on the sample;

filling the pressure chamber with an oil to apply triaxial lateral compression stresses to the sample; and applying a compression load to the bearing plate, wherein the compression load is transmitted through the plurality of force transferring rods to the tensile base, causing the tensile base to apply a tensile load on the sample, wherein the tensile load equals to the compression load.

\* \* \* \* \*